US005949189A

United States Patent [19]

Foust et al.

[11] Patent Number: 5,949,189

[45] Date of Patent: Sep. 7, 1999

[54] METHOD TO CONTROL LEACHABLE MERCURY IN FLUORESCENT LAMP

[75] Inventors: Donald Franklin Foust, Scotia; Deborah Ann Haitko; David Key Dietrich, both of Schenectady, all of N.Y.

[73] Assignee: General Electric Company, Schenectady, N.Y.

[21] Appl. No.: 08/990,266

[22] Filed: Dec. 15, 1997

[51] Int. Cl.[6] .......... H01J 17/26

[52] U.S. Cl. .......... 313/565; 313/567; 313/571

[58] Field of Search .......... 313/565, 485, 313/490, 567, 571; 445/2, 61, 73; 209/3, 14, 15, 16, 41, 42, 43

[56] References Cited

U.S. PATENT DOCUMENTS

| | | | |
|---|---|---|---|
| 5,229,686 | 7/1993 | Fowler et al. | 313/565 |
| 5,229,687 | 7/1993 | Fowler et al. | 313/565 |
| 5,736,813 | 4/1998 | Foust et al. | 313/565 |
| 5,754,002 | 5/1998 | Haitko et al. | 313/565 |
| 5,777,434 | 7/1998 | Dietrich et al. | 313/565 |
| 5,821,682 | 10/1998 | Foust et al. | 313/565 |

*Primary Examiner*—Sandra O'Shea
*Assistant Examiner*—Joseph Williams
*Attorney, Agent, or Firm*—Noreen C. Johnson; Douglas E. Stoner

[57] ABSTRACT

The formation of leachable mercury upon disposal or during TCLP testing of mercury vapor discharge lamps is substantially prevented by maintaining the amount of elemental iron at a level of less than about 1.1 milligrams per kilogram of total lamp material.

4 Claims, 1 Drawing Sheet

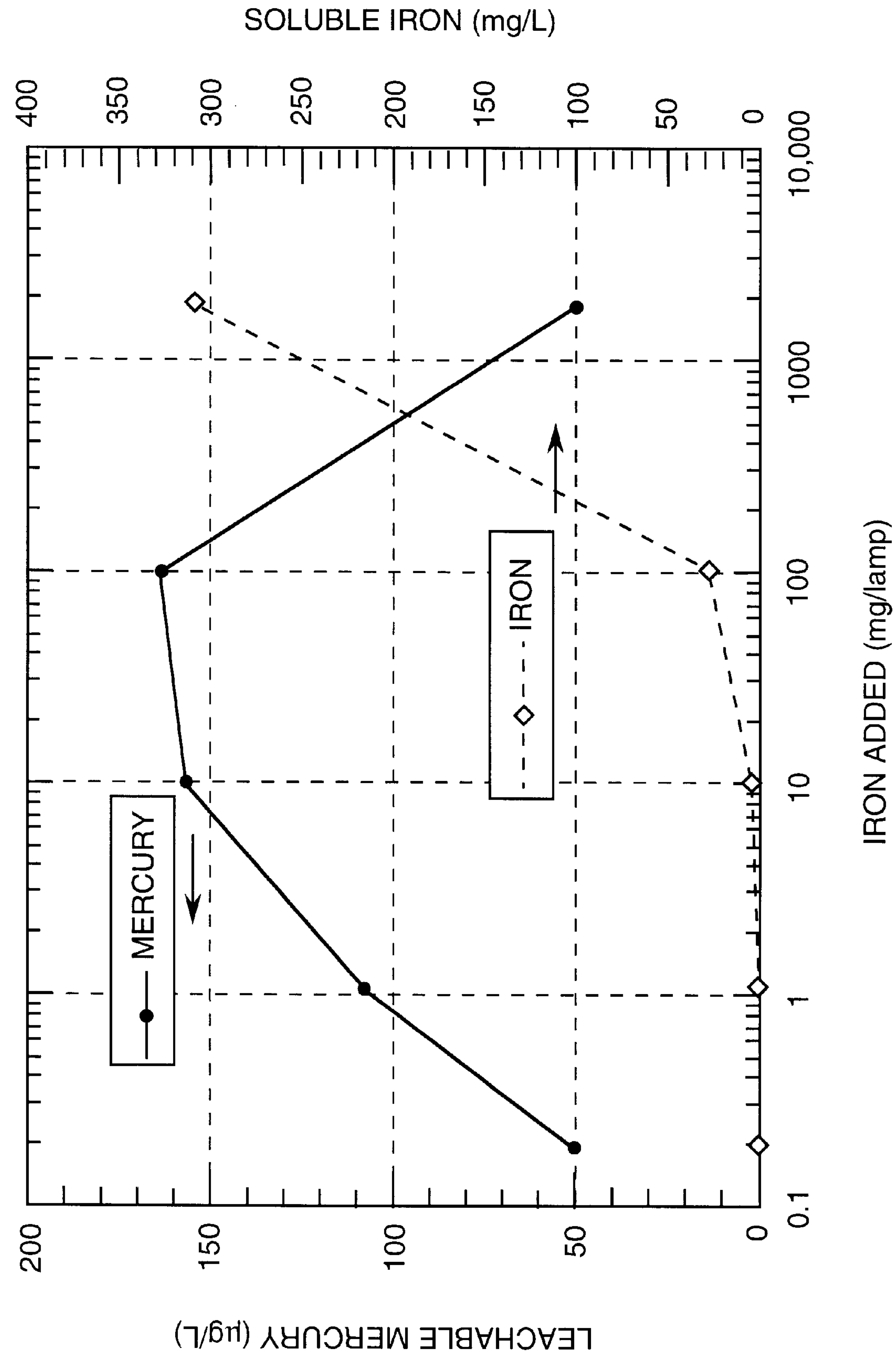
SOLUBLE IRON (mg/L)
400
350
300
250
200
150
100
50
0
LEACHABLE MERCURY (µg/L)
200
150
100
50
0
IRON ADDED (mg/lamp)
0.1
1
10
100
1000
10,000
MERCURY
IRON

METHOD TO CONTROL LEACHABLE MERCURY IN FLUORESCENT LAMP

This invention is directed to mercury vapor arc discharge lamps in which the arc discharge takes place in mercury vapor, including conventional phosphor fluorescent lamps and more particularly to avoidance of mercury pollution of landfills and ground water upon disposal of such lamps and during testing for leaching of toxic materials from such lamps and to prevention of the formation of leachable mercury in disposal and testing procedures. The lamps provided herein are characterized by reduced solubilization and leaching of mercury when the lamp is pulverized for testing or upon disposal.

BACKGROUND OF THE INVENTION

Low pressure mercury arc discharge lamps are standard lighting means which include electrodes sealed in a glass envelope, the interior of which may be coated with a phosphor. The lamp also contains a small amount of mercury and an inert gas at low pressure, of about 1 to 5 torr. The term lamp, as used herein, means the complete unit including the glass envelope and the end pieces and plugs for mounting in a lamp fixture, and wires which connect the internal components of the envelope with the end pieces.

During manufacture of fluorescent or low pressure mercury arc lamps an amount of elemental mercury ($Hg^0$) is sealed in the lamp envelope. Most of the mercury adheres to the phosphor coating, a small amount being in the vapor phase.

During operation, alkali metal carbonates from the electrodes decompose and form free oxygen in the lamp. The oxygen may react with a portion of the mercury to form soluble mercury oxide (HgO). Soluble mercury oxide is leachable from land fills and other disposal facilities. Soluble mercury oxides or other oxidized forms of mercury formed in the course of the test are detrimental to the accuracy and reliability of the standard test for determination of the leachability of toxic materials from lamp waste. This test is generally referred to as the Toxicity Leaching Characteristic Procedure or TLCP test.

There is concern about the environmental impact of soluble mercury compounds which can leach into ground water sources, rivers, streams, and the like.

DESCRIPTION OF THE INVENTION

Soluble ferric ions are capable of oxidizing elemental mercury to the monovalent, mercurous, form which is soluble in an acidic aqueous environment and therefore leachable. The formation of ferric compounds depend on exposure of elemental iron to and reaction with oxygen. Elemental iron, unexpectedly, has been found to have a significant effect on removal of leachable mercury. Reduction of the amount of soluble, i.e., leachable, mercury, is a beneficial result in the TCLP test and for the environment when lamps are disposed of in a landfill. Low concentrations of soluble iron are found to produce less leachable mercury than high concentrations of soluble iron ($Fe^{+3}$).

The invention provides a method for controlling the formation of leachable mercury resulting from oxidation of elemental mercury associated with fluorescent lamps of the mercury vapor discharge type. The method for inhibiting the formation of leachable mercury associated with mercury containing fluorescent lamps comprises maintaining the amount of iron that oxidizes to iron +3 in such lamps at less than about 1.1 milligrams per kilogram of lamp weight.

The invention provides for a low iron-content mercury vapor discharge lamp comprising an envelope of light transmitting glass which contains, an inert gas and an amount of elemental mercury, and a pair of electrodes for establishing an arc discharge. The term "low iron" content, as used herein, generally means less than about 1.1 milligram of oxidizable iron per kilo of total lamp weight. As the amount of soluble iron increases above about 1 milligram per kilogram the amount of leachable mercury increases sharply. The term "oxidizable iron", as used herein means iron which can be completely oxidized to $Fe^{+3}$ and includes any and all forms of iron which can be so oxidized.

The lamp further comprises at least one aluminum base or end cap which defines a cavity having an inner surface, and which is secured to the lamp envelope by a basing cement. Generally such lamps have a pair of end caps.

In a preferred embodiment of the invention, low iron content is achieved by substituting nickel, stainless steel, or other suitable nonferrous metals for all or part of the usual iron or iron- containing materials and components of the mercury vapor discharge lamp.

The use of low-iron components in a lamp structure minimizes oxidation of iron metal to a form which is both soluble and capable of oxidizing elemental mercury to a soluble form of mercury. Accordingly, the formation and dissolution of soluble ferric compounds from the lamp components is diminished or prevented resulting in reduction or prevention of leachable mercury compounds.

The formation of leachable mercury when fluorescent lamps are broken and exposed to landfill conditions can be prevented or minimized by preventing oxidation of certain components of the lamp. Certain metal components of fluorescent lamps particularly iron or copper coated iron lead wires generate ferric ($Fe^{+3}$) ions when exposed to moisture, oxygen, and acidity.

In order to address the growing concern that excessive amounts of mercury from disposal of fluorescent lamps might leach into surface and subsurface bodies of water, the Environmental Protection Agency has established a maximum concentration level for mercury at 0.2 milligrams of leachable mercury per liter. This is generally determined by the standard analysis known as the Toxicity Characteristic Leaching Procedure (TCLP), a well known test procedure.

In carrying of the TCLP test, the lamps are pulverized to form lamp waste material similar to that which would result from lamp disposal in land fills or other disposal locations. The ambient conditions in such locations may be such as to promote formation of leachable mercury just as the TCLP test conditions themselves tend to allow for formation of leachable mercury in amounts greater than the established limit of 0.2 milligrams per liter.

It has been found that elemental mercury added to mercury-free pulverized lamp materials prepared for the TCLP test is converted to leachable mercury in the course of the test. If elemental mercury alone or in combination with various glass, phosphor, or non-metal lamp components is tested, little or essentially no leachable mercury is found. When elemental mercury is tested in combination with metal lamp components such as iron lead wires, pins, or other metal hardware, the mercury is transformed into a leachable form.

It was determined by controlled experimentation that ferric iron (trivalent) is generated under the TCLP test conditions when carried out in the presence of oxygen and that this ionic species is able to oxidize elemental mercury to soluble mercury compounds which are measured as leachable mercury.

Corrosion or dissolution of metals from the metallic state requires the presence of both oxygen and a solvent such as water conditions that exist in the TCLP test and landfill situations. Accordingly, it has been found that the formation can be controlled or prevented by controlling or excluding exposure to oxygen of the iron containing metal lamp components.

The principles and practice of this invention will be more fully understood when considered in view of the following examples.

All TCLP test data was obtained by the test procedure prescribed on pages 26987–26998 volume 55, number 126 of the Jun. 29 , 1990 issue of the Federal Register.

Briefly, lamps being tested are pulverized into particulate form having the prescribed particle size which is capable of passing through ⅜ inch sieve. The test material is then extracted with a sodium acetate-acetic acid buffer at a pH of about 4.93

To prevent the spurious formation of leachable mercury upon disposal of mercury vapor discharge lamps and to improve the reliability of the TCLP test the formation of soluble iron is controlled by use of iron-free or low iron parts as components for lamp manufacture.

The effect of both soluble iron and copper on the formation of soluble mercury is evident from the data in Table 1, below. As the head space volume(available oxygen) increases, the amount of soluble mercury increases in response to the formation of increasing amounts of soluble iron (ferric) and copper.

TABLE 1

| | Head Space (mL) | Soluble Mercury (ppb) | Soluble Iron (ppm) | Soluble Copper (ppm) |
|---|---|---|---|---|
| 0 | 0 | 210 | 3.62 | 0.35 |
| 1 | 140 | 214 | 4.63 | 0.40 |
| 2 | 205 | 203 | 5.04 | 0.63 |
| 3 | 360 | 250 | 5.22 | 0.43 |
| 4 | 494 | 311 | 5.22 | 0.51 |
| 5 | 763 | 525 | 6.13 | 1.04 |
| 6 | 1013 | 458 | 5.80 | 1.02 |
| 7 | 1508 | 583 | 8.12 | 1.13 |

Table 2, below, shows the effect of iron content on the formation of leachable mercury in the TCLP test procedure described above.

TABLE 2

| Fe mg | Leachable Hg pm | Soluble Fe ppm |
|---|---|---|
| 0.2000 | 50.000 | 0.50000 |
| 1.1000 | 108.00 | 0.50000 |
| 10.100 | 158.00 | 3.2000 |
| 103.30 | 165.00 | 27.600 |
| 1882.8 | 50.000 | 312.00 |

Theoretical calculations of the maximum oxidized iron content, on a mass balance basis, for formation of about 200 ppb of leachable mercury is about 1.1 milligrams per kilogram of lamp weight. Table 2, above, is reproduced in graph form in FIG. 1. The graph indicates that at about 100 ppb of soluble iron (oxidized to $Fe^{+3}$) the amount of leachable mercury exceeds 50 ppb. In the TCLP test solution, the presence of about 1.1 milligrams of oxidized iron ($Fe^{+3}$) per kilogram of lamp weight will cause formation of about 200 ppb of leachable mercury. Less oxidized iron will reduce the level of leachable mercury as shown in FIG. 1.

What is claimed is:

1. A method for inhibiting the formation of leachable mercury associated with mercury containing fluorescent lamps which comprises using a low content of iron to maintain an amount of oxidizable iron in said lamps at less than about 1.1 milligrams per kilogram of lamp weight.

2. A method according to claim 1 in which oxidizable iron is any form of iron which can be completely oxidized to $Fe^{+3}$.

3. A method according to claim 1 in which the amount of oxidizable iron is controlled by using low iron components to fabricate mercury containing fluorescent lamps.

4. The method according to claim 1 in which low iron content is achieved by substituting nonferrous materials for iron or iron-containing components.

* * * * *